United States Patent Office 3,308,094
Patented Mar. 7, 1967

3,308,094
CATALYST FOR CURING POLYEPOXIDES
Allan E. Sherr, Norwalk, Conn., assignor to American Cyanamid Company, Stamford, Conn., a corporation of Maine
No Drawing. Filed Nov. 8, 1962, Ser. No. 236,430
16 Claims. (Cl. 260—47)

This invention relates to novel curable polyepoxide-containing compositions. This invention further relates to curable polyepoxide-containing compositions, and particularly thermosetting epoxy resinous compositions, which contain a novel curing catalyst.

The widespread commercial importance achieved in recent years by polyepoxide-containing compositions, and particularly thermosetting epoxy resinous compositions, has led to considerable experimentation in this field. This is especially true with respect to attempts to provide better methods of curing these compositions.

Among the catalytic materials most commonly used at present to cure polyepoxide-containing compositions are sodium hydroxide, sodium alkoxides and phenoxides, primary, secondary and tertiary amines, Friedel-Crafts catalysts and various inorganic and organic acids and anhydrides. However, one disadvantage shared by most of these catalysts is that they will convert polyepoxide-containing compositions to a substantially insoluble and infusible state fairly rapidly either at room temperature or at only slightly elevated temperatures, thus giving catalyzed compositions which exhibit marked increases in room temperature viscosity shortly after the addition of the catalyst. This makes it necessary to use these catalyzed compositions within a relatively short time after the catalyst has been added.

A further and perhaps more serious disadvantage inherent in many of these commonly used catalysts is the fact that they must be used in relatively large amounts to achieve the degree of cure necessary to obtain good physical properties, e.g., flexural strength, high deflection temperature, and the like, in the final cured composition.

I have now discovered that relatively small amounts of the 1,1,3,3-tetraalkylguanidines and 1,1,2,3,3-pentaalkylguanidines represented by the general formula:

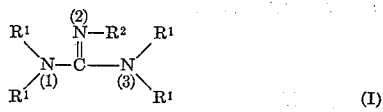

(I)

wherein each $R^1$ represents the same or a different lower alkyl group having from 1 to 6 carbon atoms, inclusive, such as methyl, ethyl, propyl, n-butyl, sec-butyl, amyl, hexyl and the like, and $R^2$ can represent hydrogen (in the case of the tetra-substituted guanidines) or can also represent a lower alkyl group (in the case of the penta-substituted guanidines), preferably one having from 1 to 6 carbon atoms, inclusive, as described above for $R^1$, are efficient curing catalysts for polyepoxides in general and epoxy resins in particular. More particularly, the practice of the present invention permits the preparation of polyepoxide-containing compositions which have a long pot life and yet can be cured at moderately elevated temperatures to provide substantially insoluble and infusible products having good physical properties.

It is, therefore, an object of my invention to provide novel curable polyepoxide-containing compositions.

It is also an object of my invention to provide novel curable polyepoxide-containing compositions, and particularly thermosetting epoxy resinous compositions, containing, as a curing catalyst, a 1,1,3,3-tetraalkylguanidine, e.g., 1,1,3,3-tetramethylguanidine, or a 1,1,2,3,3-pentaalkylguanidine, e.g., 1,1,2,3,3-pentamethylguanidine.

A further object of my invention is to provide substantially insoluble and infusible polyepoxide-containing compositions, and particularly epoxy resinous compositions, which have been cured in the presence of a 1,1,3,3-tetraalkylguanidine or a 1,1,2,3,3-pentaalkylguanidine.

These and other objects of my invention will be discussed more fully hereinbelow.

The tetra- and pentaalkylguanidines employed in the practice of the present invention, as well as methods for their preparation, are so well known in the art that a detailed discussion of said methods herein is considered unnecessary. An illustrative but by no means exhaustive listing of 1,1,3,3-tetraalkylguanidines and 1,1,2,3,3-pentaalkylguanidines coming within the scope of Formula I above includes:

1,1,3,3-tetramethylguanidine,
1,1,3,3-tetraethylguanidine,
1,1,3,3-tetrapropylguanidine,
1,1,-diethyl-3,3-dimethylguanidine.
1,1-dimethyl-3,3-dipropylguanidine,
1,1-dibutyl-3,3-dimethylguanidine,
1,3-diethyl-1,3-dimethylguanidine,
1-ethyl-1,3,3-trimethylguanidine,
1-amyl-1,3,3-trimethylguanidine,
1-hexyl-1,3,3-triethylguanidine,
1,1,2,3,3-pentamethylguanidine,
1,1,2,3,3-pentaethylguanidine,
2-ethyl-1,1,3,3-tetramethylguanidine,
2-propyl-1,1,3,3-tetramethylguanidine,
2-butyl-1,1,3,3-tetramethylguanidine,
2-hexyl-1,1,3,3-tetramethylguanidine,
1,1-diethyl-2,3,3-trimethylguanidine,
1,1-dipropyl-2,3,3-trimethylguanidine,
1,1-dibutyl-2,3,3-trimethylguanidine,
1,3-dimethyl-1,2,3-triethylguanidine,
1,2-diethyl-1,3,3-trimethylguanidine,
1-hexyl-1,2,3,3-tetramethylguanidine, and the like. The tetramethyl- and pentamethylguanidines, due to their relative ease of preparation, are preferred. The above-described tetraalkyl- and pentaalkylguanidines are either liquids at room temperature or will melt at temperatures below those at which the polyepoxide compositions containing them will be cured and, in the liquid state, will dissolve in the polyepoxide.

The polyepoxide-containing compositions which can be cured using my novel catalysts comprise organic materials having a plurality of reactive 1,2-epoxy groups, i.e.,

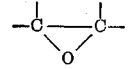

groups. These polyepoxide materials can be monomeric or polymeric, saturated or unsaturated, aliphatic, cycloaliphatic, aromatic or heterocyclic, and they may be substituted, if desired, with other substituents besides the epoxy groups, e.g., hydroxyl groups, ether radicals, halogen atoms, and the like.

A widely used class of polyepoxides which can be catalyzed according to the practice of the present invention encompasses the resinous epoxy polyethers obtained by reacting an epihalodyrin, such as epichlorohydrin, epibromohydrin, epiiodohydrin, and the like, with either a polyhydric phenol or a polyhydric alcohol.

Among the polyhydric phenols which can be used in preparing these resinous epoxy polyethers are dihydric phenols represented by the general formula:

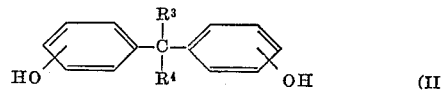

(II wherein the phenolic hydroxy groups may be in any of the 2,2'; 2,3'; 2,4'; 3,3'; 3,4'; or 4,4' positions on the aromatic nuclei, and each of $R^3$ and $R^4$ represent hydrogen, an alkyl group, such as methyl, ethyl, propyl, isopropyl, butyl, sec-butyl, tert-butyl, pentyl, isopentyl, hexyl, isohexyl, and the like; a cyclo(lower)alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the phenolic rings may have other substituents besides the hydroxyl groups, for example lower alkyl groups containing from 1 to 4 carbon atoms, i.e., methyl, ethyl, propyl, isopropyl, butyl, sec-butyl and tert-butyl groups, halogen atoms, i.e., fluorine, chlorine, bromine or iodine, and the like.

An illustrative but by no means exhaustive listing of dihydric phenols falling within this general formula includes 4,4'-dihydroxydiphenylmethane, 4,4' - dihydroxydiphenyldimethylmethane (bisphenol A), 2,4'-dihydroxydiphenylethylmethane, 3,3' - dihydroxydiphenyldiethylmethane, 3,4' - dihydroxydiphenylmethylpropylmethane, 2,3' - dihydroxydiphenylethylphenylmethane, 4,4' - dihydroxydiphenylpropylphenylmethane, 4,4' - dihydroxydiphenylbutylphenylmethane, 2,2' - dihydroxydiphenylditolylmethane, 4,4'-dihydroxydiphenyltolylmethylmethane, and the like.

Other polyhydric phenols which may also be coreacted with an epihalohydrin to provide these resinous epoxy polyethers are such compounds, as resorcinol, hydroquinone, substituted hydroquinones, e.g., p-tert-butylhydroquinone, and the like, indanols such as those disclosed in U.S. Patent No. 2,754,285 to Petropoulos, and polyhydric phenols having two hydroxy aryl groups separated by an aliphatic chain of at least six carbon atoms in length, said chain being attached by carbon-to-carbon bonding to nuclear carbon atoms of the hydroxyaryl groups. Members of this latter class of polyhydric phenols can be conveniently obtained by condensing phenol itself with a phenol substituted with an aliphatic side chain having one or more olefinic double bonds positioned therein, thus providing the required number of separating atoms between the two hydroxyphenyl groups of the resulting polyhydric phenol. Cardonal, obtainable in known manner from cashew nut shell liquid, is a convenient source of phenols containing such side chains.

Among the polyhydric alcohols which can be coreacted with an epihalohydrin to provide these resinous epoxy polyethers are such compounds as ethylene glycol, propylene glycols, butylene glycols, pentane diols, bis (4-hydroxycyclohexyl) dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2,2',3,3'-tetrahydroxydipropyl sulfide and the like, mercapto alcohols such as α-monothioglycerol, α,α'-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

When preparing these resinous epoxy polyethers from an epihalohydrin and a polyhydric phenol, the reaction will preferably be carried out in the presence of an amount of an alkaline material, e.g., sodium hydroxide or potassium hydroxide, sufficient to combine with the halogen released by the epihalohydrin during the course of the reaction. The amount of epihalohydrin used is generally in excess of the stoichiometric quantity required for reaction with the epihalohydrin. In addition the reaction will preferably be carried out at a temperature ranging from about 50° C. to about 150° C., usually for periods of time ranging up to several hours.

When reacting in epihalohydrin with a polyhydric alcohol, the reaction is preferably carried out in the presence of an acid-acting material, e.g., hydrofluoric acid or a boron trifluoride-ether complex, and the resulting halohydrin product is then dehydrohalogenated in the presence of an alkaline material.

The resulting resinous reaction products may contain free terminal hydroxyl groups or terminal hydroxyl groups and terminal epoxy groups, and will vary in molecular weight depending on the reactants employed, the relative amounts thereof, and the extent to which the reaction is carried out. These thermosetting epoxy resinous materials are generally soluble in solvents such as acetone, methyl ethyl ketones, methyl isobutyl ketone, cyclohexanone, and the like.

A related class of polymeric polyepoxides which can be catalyzed according to the practice of the present invention comprises the polyepoxypolyhydroxy polyethers obtained by reacting, again preferably in alkaline medium, a polyhydric phenol such as bisphenol A, resorcinol, catechol and the like, or a polyhydric alcohol such as glycerol, sorbitol, pentaerythritol and the like, with a polyepoxide such as bis(2,3-epoxypropyl)ether, bis(2,3-epoxy-2-methylpropyl)ether, 1,2-epoxy-4,5-epoxypentane and the like.

Another class of polymeric polyepoxides which can be cured by means of the above-described tetra- and penta-alkylguanidines includes the epoxy novolac resins obtained by reacting, preferably in the presence of a basic catalyst, e.g., sodium or potassium hydroxide, an epihalohydrin such as epichlorohydrin with the resinous condensate of an aldehyde, e.g., formaldehyde, and either a monohydric phenol, e.g., phenol itself, or a polyhydric phenol, e.g., bisphenol A. A representative number of the epoxy novolac resins obtained by reacting an epihalohydrin with a monohydric phenol-formaldehyde resinous condensate can be represented by the general formula:

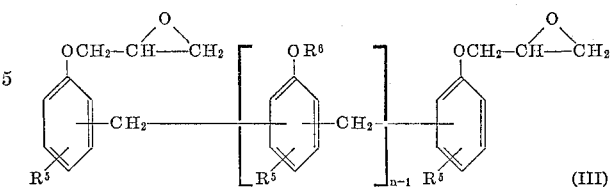

wherein, for example, $R^5$ represents either hydrogen or a lower alkyl group, such as methyl, ethyl, and the like, $R^6$ represents hydrogen, a halohydrin group, e.g.,

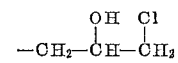

a glycol group, e.g.,

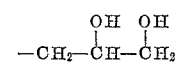

or a glycidyl group, i.e.,

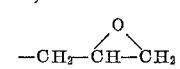

and $n$ is a number of 1 or greater. Similarly, a representative number of the epoxy novolac resins obtained by reacting an epihalohydrin with a polyhydric phenol-formaldehyde resinous condensate can be represented by the general formula:

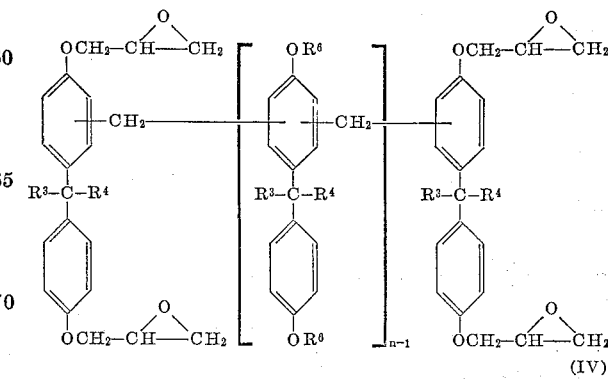

wherein $R^3$ and $R^4$ are as defined for Formula II above and $R^6$ and $n$ are as defined for Formula III above. Further details concerning the nature and preparation of these epoxy novolac resins can be obtained in Carswell, T. S., "Phenoplasts" (New York: Interscience Publishers, 1947), page 29 et seq.

Still another class of polymeric polyepoxides which can be catalyzed with the above-described tetra- and penta-substituted guanidines includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but in the absence of alkaline or acidic catalysts, leaving the epoxy groups unaffected and, therefore, regularly or randomly dispersed along the polymer chains. Among such ethylenically unsaturated epoxy-containing monomers are vinyl 2,3-glycidyl ether, allyl 2,3-glycidyl ether, methallyl 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene, and the like. Suitable comonomers for copolymerization with these ethylenically unsaturated epoxy-containing monomers include styrene, acrylonitrile, methacrylonitrile, methyl acrylate, ethyl acrylate, methyl methacrylate, vinyl chloride, vinylidene chloride, vinyl acetate, diallyl phthalate, and the like.

Among the monomeric polyepoxides which can be catalyzed according to the practice of the present invention are the di- and triepoxides represented by the general formula:

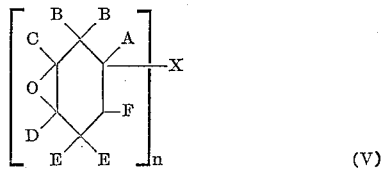

wherein A through F represent hydrogen or an alkyl group, preferably a lower alkyl group having from 1 to 4 carbon atoms, inclusive, such as methyl, ethyl, propyl, n-butyl and the like, and X represents a divalent radical which can be

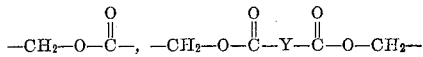

or

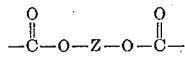

in which case $n$ equals 2, or a trivalent radical which can be

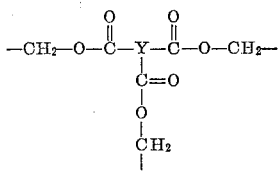

or

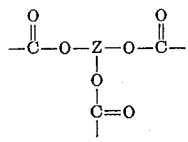

in which case $n$ equals 3, with Y representing an aliphatic or aromatic hydrocarbon radical containing from 2 to 12 carbon atoms, inclusive, and Z representing a lower aliphatic hydrocarbon radical or a lower oxyalkylene group, e.g., -alkylene-O-alkylene- and the like. Included among such di- and triepoxides are 3,4-epoxycyclohexylmethyl, 3,4-epoxycyclohexanecarboxylate, 3,4-epoxy-6-methylcyclohexylmethyl, 3,4-epoxy-6-methylcyclohexanecarboxyl- ate, bis(3,4-epoxycyclohexylmethyl)maleate, bis(3,4-epoxy-6-methylcyclohexylmethyl)succinate, ethylene glycol bis(3,4-epoxycyclohexanecarboxylate), 2-ethyl-1,3-hexanediol bis(3,4-epoxy-6-methylcyclohexanecarboxylate), tris(3,4-epoxycyclohexylmethyl)1,2,4-hexanetricarboxylate, glyceryl tris(3,4-epoxy-6-methylcyclohexanecarboxylate) and the like.

Other monomeric polyepoxides which can be cured by means of the above-described substituted guanidines include dicyclopentadiene dioxide, epoxidized triglycerides such as epoxidized glycerol trioleate, epoxidized glycerol trilinoleate, the diacetate of epoxidized glycerol trilinoleate and the like, 1,8-bis(2,3-epoxypropoxy)octane, 1,4-bis(2,3-epoxypropoxy)cyclohexane, 1,4-bis(3,4-epoxybutoxy)-2-chlorocyclohexane, 1,3-bis(2,3-epoxypropoxy)benzene, 1,4-bis(2,3-epoxypropoxy)benzene, 1,3-bis(2-hydroxy-3,4-epoxybutoxy)benzene, 1,4-bis(2-hydroxy-4,5-epoxypentoxy)benzene, 1,3-bis(4,5-epoxypentoxy)-5-chlorobenzene, 4,4'-bis(2,3-epoxypropoxy)diphenyl ether, and epoxy ethers of polybasic acids such as diglycidyl succinate, diglycidyl adipate, diglycidyl maleate, diglycidyl phthalate, diglycidyl hexachloroendomethylenetetrahydrophthalate and diglycidyl 4,4'-isopropylidenedibenzoate, and the like.

Many of these polyepoxides, and particularly those which are polymeric, can be conveniently referred to in terms of epoxy equivalency, i.e., the average number of epoxy groups per molecule in the polyepoxide material. Where the polyepoxide is monomeric and all of its epoxy groups are intact, its epoxy equivalency will be represented by an integer, usually 2 or greater. However, where the polyepoxide is polymeric its epoxy equivalency will usually be represented by a fractional value of at least about 1.0 or greater, e.g., 1.5, 1.8, 2.3 and the like, since the polymer will usually contain molecules of different molecular weight and can also contain some monomeric polyepoxide or have some of its epoxy groups dehydrated or otherwise reacted.

It will be appreciated by those skilled in the art that the catalyzed polyepoxide-containing compositions which can be prepared according to the practice of the present invention are not limited to those containing the above-described polyepoxides, but that said polyepoxides are to be considered merely as being representative of the class of polyepoxides as a whole. Further details concerning the nature and preparation of the above-described polyepoxides can be found in U.S. Patents Nos. 2,633,458; 2,872,427 and 2,884,408, among others, which are incorporated herein by reference.

The above-described tetra- and pentaalkylguanidines can be employed in amounts ranging from about 0.5 part to about 30 parts by weight, and preferably from about 1 part to about 10 parts by weight, per hundred parts of polyepoxide. Mixtures of two or more tetraalkylguanidines, or two or more pentaalkylguanidines, or one or more tetraalkylguanidines with one or more pentaalkylguanidines can also be employed.

The resulting catalyzed polyepoxide-containing compositions can be used in any of the applications for which polyepoxides are customarily used, e.g., as adhesives, impregnants, surface coatings, potting and encapsulating compositions, in laminates, and particularly in glass cloth-filled laminates for use in electrical applications such as printed circuits and the like, in castings for electrical apparatus, and the like.

Various conventionally employed additives can be admixed with these tetra- or pentaalkylguanidine-catalyzed polyepoxide-containing compositions prior to final cure. For example, in certain instances it may be desirable to add minor amounts of co-catalysts or hardeners along with the tetra- or pentaalkylguanidine. Included among these known catalysts and hardeners are alkali metal hydroxides, e.g., sodium or potassium hydroxide; alkali metal alkoxides and phenoxides, e.g., sodium phenoxide; primary, secondary and tertiary monoamines and polymines, e.g., mono-, di- and trimethylamine, mono-, di- and triethylamine, isopropylamine, diisopropylamine, butylamine, dibutylamine, cyclohexylamine, dicyclohexylamine, diethylaminopropylamine, benzylamine, benzyldimethylamine, diethylenetriamine, dipropylenetriamine, dibutylenetriamine, triethylenetetramine, tetraethylenepentamine, N,N-diethyl-1,3-propanediamine, 1,2-diamino-2-methylpropane, 2,3-diamino-2-methylbutane, 2,4-diamino-2-methylpentane, ethanolamine, triethanolamine, diethylethanolamine, aniline, dimethylaniline, dimethylaminomethylphenol, tri(dimethylaminomethyl)phenol, dicyandiamide, melamine, diallylmelamine, and the like, as well as fatty acid salts thereof, e.g., tri(dimethylaminomethyl)phenol tri(2-ethylhexoate), and the like; polycarboxylic acids, e.g., oxalic acid, succinic acid, phthalic acid, maleic acid, and the like, as well as the corresponding anhydrides, and phenolic compounds, e.g., phenol, cresols, xylenols, resorcinol, and the like. Conventional pigments, dyes, fillers, flame-retarding agents and other compatible natural and synthetic resins can also be added. Furthermore, known solvents for the polyepoxide materials, such as acetone, methyl ethyl ketone, methyl isobutyl ketone, dioxane, Cellosolve acetate, methyl Cellosolve acetate, dimethylformamide, trichlorpropane, benzene, toluene, xylene, and the like, can be used if desired, e.g., in coating formulations.

Depending on the composition itself and the end use for which it is intended, curing, i.e., advancing the polyepoxy component of the composition and any other component co-reactable therewith to a state of substantial insolubility and infusibility, can take place at temperatures ranging from about room temperature, i.e., about 25° C., or below (when the amount of catalyst present is at or near the upper limit of the above-stated range or, at lower catalyst concentrations, over a relatively long period of time) to about 200° C.

In order that those skilled in the art may more fully understand the inventive concept presented herein, the following examples are set forth. These examples are given solely by way of illustration, and should not be considered as expressing limitations unless so set forth in the appended claims. All parts and percentages are by weight, unless otherwise stated.

*Example I*

One hundred parts of Epon 828, a commercially available bisphenol A-epichlorohydrin thermosetting epoxy resinous condensate having a viscosity (measured at 25° C.) of 100–160 poises and an epoxide equivalent (grams of resin containing one gram-equivalent of epoxide) of 175–210, were heated to 50° C. in a suitable container. Next, 0.5 part of 1,1,3,3-tetramethylguanidine was added, and the resulting mixture was stirred for a few moments to disperse the catalyst.

A casting cell made of two 6-inch square glass plates separated by ⅛-inch thick gasketing material was filled with the catalyzed epoxy resin mixture and then heated in an oven for 20 hours at 100° C. followed by 2 hours at 150° C. to give a hard, cured resin casting. Various significant physical properties of this casting are given in Table I below.

*Examples II–V*

The procedure employed in Example I was repeated in every detail except for the following. In Examples II, III and IV, the amounts of 1,1,3,3-tetramethylguanidine used were 1 part, 2 parts and 7 parts, respectively, and in each case curing was accomplished by heating the casting cell in an oven at 94° C. for 4½ hours. In Example V, which served as a control, the tetramethylguanidine was replaced by 12 parts of tri(dimethylaminomethyl)phenol tri(2-ethylhexoate), a commercially-used curing catalyst, and curing was accomplished by heating the casting cell in an oven at 94° C. for 4½ hours. In every case, a hard, cured casting resulted, and various significant physical properties of these castings are also given in Table I.

TABLE I

| Example | Flexural Modulus [1] | Flexural Strength [1] | Rockwell Hardness [2] | Deflection Temperature under load [3] | Dielectric Constant | Dissipation Factor |
|---|---|---|---|---|---|---|
| I | 0.51×10⁶ | 19,500 | 87 | 70 | 3.72 | 0.001 |
| II | 0.47×10⁶ | 19,500 | 79 | 95 | 3.78 | 0.0033 |
| III | 0.47×10⁶ | 19,900 | 88 | 95 | 3.62 | 0.0038 |
| IV | 0.48×10⁶ | 18,800 | 80 | 82 | 3.53 | 0.0044 |
| V (control) | 0.44×10⁶ | 16,200 | 76 | 68 | 3.50 | 0.0051 |

[1] In pounds per square inch.
[2] "M" Scale.
[3] In ° C.

*Example VI*

The pot life of an epoxy resinous condensate catalyzed according to the practice of the present invention was determined in the following manner. Samples of the epoxy resin employed in Examples I–V containing no catalyst, 1 phr (parts per hundred parts of resin), 2 phr and 7 phr of 1,1,3,3-tetramethylguanidine, respectively, were maintained in suitable containers at room temperature, and viscosity measurements were made periodically, using a Brookfield viscometer (No. 4 spindle at 12 r.p.m.). These viscosity measurements are given in the following table.

TABLE II

| Time [1] | Viscosity [2] | | | |
|---|---|---|---|---|
| | No Catalyst | 1 phr. | 2 phr. | 7 phr. |
| 0 | 9,150 | 6,750 | 2,750 | 2,150 |
| 0.5 | 9,000 | 5,750 | 2,900 | 2,250 |
| 1 | 9,250 | 5,900 | 3,325 | 2,750 |
| 1.5 | 9,250 | 6,700 | 3,000 | 3,100 |
| 2 | 9,250 | 6,700 | 3,150 | 2,750 |
| 2.5 | | 7,750 | 3,650 | 3,000 |
| 3 | 9,500 | 8,250 | 4,150 | 3,300 |
| 3.5 | | 9,400 | 4,600 | 3,500 |
| 4.5 | 9,500 | 10,000 | 5,500 | 4,000 |
| 5.5 | | 10,800 | 6,700 | 5,300 |
| 6.5 | 9,500 | 11,350 | 7,350 | 5,300 |
| 23.5 | | 22,250 | 25,000 | >100,000 |
| 27 | 10,000 | 23,500 | 29,250 | >100,000 |
| 31 | 11,500 | 28,500 | 39,500 | >100,000 |
| 48 | >100,000 | | >100,000 | |

[1] In hours.
[2] In centipoises.

As can be seen from the above data, epoxy resins catalyzed according to the practice of the present invention have excellent pot lives.

*Example VII*

The procedure of Example I was again repeated in every detail except for the following. The tetramethylguanidine was replaced with 10 parts of 1,1,2,3,3-pentamethylguanidine, and curing was accomplished by heating the casting cell in an oven at 100° C. for 6 hours. The resulting casting was hard and fully cured.

Example VIII

One hundred parts of Araldite 6060, a commercially available bisphenol A-epichlorohydrin thermosetting epoxy resinous condensate having a viscosity (measured at 130° C.) of 100 poises and an epoxide equivalent (per 100 grams of resin) of 0.22, were admixed with 20 parts of 1,1,3,3-tetramethylguanidine in an aluminum dish. This mixture was warmed to 80° C. with stirring to effect dispersion of the catalyst and then heated in an oven for 2 hours at 80° C., followed by 3 hours at 155° C. The resulting brittle, cured epoxy resin had a softening temperature of 88° C.

Example IX

One hundred parts of Araldite 6005, a commercially available bisphenol A-epichlorohydrin thermosetting epoxy resinous condensate having a viscosity (measured at 25° C.) of 70–100 poises and an epoxide equivalent (per 100 grams of resin) of 0.53–0.55, were admixed with 20 parts of 1,1,3,3-tetramethylguanidine in an aluminum dish. This mixture was warmed to 80° C. with stirring to effect dispersion of the catalyst, and then heated in an oven for 2 hours at 80° C., followed by 3 hours at 155° C. The resulting cured epoxy resin (Rockwell Hardness, M Scale, of 77±5) had a softening temperature above 100° C.

Example X

The procedure employed in Example IX was repeated in every detail except for the following. Ten parts of 1,1,2,3,3-pentamethylguanidine were employed as the curing catalyst, and the catalyzed resin was heated for 3 hours at 80° C., followed by 18 hours at 148° C. The resulting brittle, cured epoxy resin had a softening temperature of 80° C.

Examples XI–XV

In each of these examples, the procedure employed in Example IX was again repeated in every detail except for the following. In Examples XI, XII and XIII, the pentamethylguanidine catalyst was replaced by 15 parts of 1-ethyl-1,3,3-trimethylguanidine, 15 parts of 1,1-diethyl-3,3-dimethylguanidine and 15 parts of 1,1,3,3-tetraethylguanidine, respectively. In Examples XIV and XV, the pentamethylguanidine catalyst was replaced by 15 parts of 1,1,3,3-tetramethyl-2-ethylguanidine and 15 parts of 1,1,2,3,3-pentaethylguanidine, respectively, and in each case the catalyzed resin was cured by heating it for 3 hours at 80° C., followed by 18 hours at 148° C. In every case, the resulting epoxy resin was fully cured.

Example XVI

One hundred parts of Araldite 506, a commercially available bisphenol A-epichlorohydrin thermosetting epoxy resinous condensate having a viscosity (measured at 25° C.) of 50–70 poises and an epoxide equivalent (per 100 grams of resin) of 0.54–0.58, were admixed with 20 parts of 1,1,3,3-tetramethylguanidine in an aluminum dish. This mixture was warmed to 80° C. with stirring to effect dispersion of the catalyst and then heated in an oven for 2 hours at 80° C., followed by 3 hours at 155° C. The resulting cured epoxy resin (Rockwell Hardness, M Scale, of 80±5) had a softening temperature of 95° C.

Example XVII

The procedure of Example XVI was repeated in every detail except for the following. Ten parts of 1,1,2,3,3-pentamethylguanidine were employed as the curing catalyst, and the catalyzed resin was heated for 3 hours at 80° C., followed by 18 hours at 148° C. The resulting cured epoxy resin (Rockwell Hardness, M Scale, of 84±2) had a softening temperature of 85° C.

Example XVIII

Two parts of 1,1,3,3-tetramethylguanidine and 0.45 part of phenol were heated, with stirring, to a temperature of about 40° C. in a suitable vessel until a substantially homogeneous blend was obtained. This blend was then added, with stirring, to 10 parts of Oxiron 2001, a commercially available thermosetting epoxidized polyolefin having a viscosity (measured at 25° C.) of 160 poises and an epoxide equivalent (grams of resin containing one gram-equivalent of epoxide) of 145, contained in an aluminum dish. The catalyzed mixture was warmed to 80° C. with stirring to effect substantially complete dispersion of the catalyst, then heated in an oven for 2 hours at 80° C., followed by 18 hours at 148° C. to give a cured epoxy resin.

Example XIX

The procedure of Example XVIII was repeated using 2 parts of 1,1,3,3-tetramethylguanidine as the sole catalyst and Oxiron 2002, a commercially available thermosetting epoxidized polyolefin having a viscosity (measured at 25° C.) of 15 poises and an epoxide equivalent (grams of resin containing one gram-equivalent of epoxide) of 232, in place of Oxiron 2001. A cured epoxy resin resulted.

Example XX

The procedure of Example XIX was repeated using 0.45 part of phenol together with the tetramethylguanidine. The resulting cured epoxy resin was rubbery in appearance, and had a Rex Hardness of 41±4.

It will be obvious to those skilled in the art that other changes and variations can be made in carrying out the present invention without departing from the spirit and scope thereof as defined in the appended claims.

I claim:

1. A composition comprising (A) an organic resin forming polyepoxide compound selected from the group consisting of monomeric and polymeric epoxides having a plurality of reactive 1,2-epoxy groups, and an epoxide equivalency of at least 1.0 and (B) a catalytic amount of a guanidine represented by the general formula:

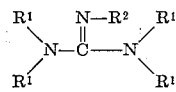

wherein each $R^1$ represents an alkyl group having from 1 to 6 carbon atoms, inclusive, and $R^2$ represents a member selected from the group consisting of hydrogen and a lower alkyl group.

2. A composition comprising (A) an organic resin forming polyepoxide compound selected from the group consisting of monomeric and polymeric epoxides having a plurality of reactive 1,2-epoxy groups, and an epoxide equivalency of at least 1.0 and (B) a catalytic amount of 1,1,3,3-tetramethylguanidine.

3. A composition comprising (A) an organic resin forming polyepoxide compound selected from the group consisting of monomeric and polymeric epoxides having a plurality of reactive 1,2-epoxy groups, and an epoxide equivalency of at least 1.0 and (B) a catalytic amount of a 1,1,2,3,3,-pentaalkylguanidine wherein the alkyl groups contain from 1 to 6 carbon atoms, inclusive.

4. A composition comprising (A) an organic resin forming polyepoxide compound selected from the group consisting of monomeric and polymeric epoxides having a plurality of reactive 1,2-epoxy groups, and an epoxide equivalency of at least 1.0 and (B) a catalytic amount of 1,1,2,3,3-pentamethylguanidine.

5. A composition comprising (A) an organic resin forming polyepoxide compound selected from the group consisting of monomeric and polymeric epoxides having a plurality of reactive 1,2-epoxy groups which comprises a thermosetting resinous reaction product of a polyhydric phenol and an epihalohydrin, having an epoxide equivalency of at least 1.0 and (B) a catalytic amount of a 1,1,3,3-tetraalkylguanidine wherein the alkyl groups contain from 1 to 6 carbon atoms, inclusive.

6. A composition comprising (A) an organic resin forming polyepoxide selected from the group consisting of monomeric and polymeric epoxides having a plurality of reactive 1,2-epoxy groups which comprises a thermosetting resinous reaction product of bisphenol A and epichlorohydrin having an epoxide equivalency of at least 1.0, and (B) a catalytic amount of 1,1,3,3-tetramethylguanidine.

7. A composition comprising (A) an organic resin forming polyepoxide compound selected from the group consisting of monomeric and polymeric epoxides having a plurality of reactive 1,2-epoxy groups which comprises a thermosetting resinous reaction product of a polyhydric phenol and an epihalohydrin, having an epoxide equivalency of at least 1.0 and (B) a catalytic amount of a 1,1,2,3,3-pentaalkylguanidine wherein the alkyl groups contain from 1 to 6 carbon atoms, inclusive.

8. A composition comprising (A) an organic resin forming polyepoxide selected from the group consisting of monomeric and polymeric epoxides having a plurality of reactive 1,2-epoxy groups which comprises a thermosetting resinous reaction product of bisphenol A and epichlorohydrin having an epoxide equivalency of at least 1.0, and (B) a catalytic amount of 1,1,2,3,3-pentamethylguanidine.

9. A substantially insoluble and infusible resinous composition obtained by curing a composition comprising (A) an organic resin forming polyepoxide selected from the group consisting of monomeric and polymeric epoxides having a plurality of reactive 1,2-epoxy groups having an epoxide equivalency of at least 1.0, and (B) a catalytic amount of a 1,1,3,3-tetraalkylguanidine wherein the alkyl groups contain from 1 to 6 carbon atoms, inclusive.

10. A substantially insoluble and infusible resinous composition obtained by curing a composition comprising (A) an organic resin forming polyepoxide selected from the group consisting of monomeric and polymeric epoxides having a plurality of reactive 1,2-epoxy groups having an epoxide equivalency of at least 1.0, and (B) a catalytic amount of 1,1,3,3-tetramethylguanidine.

11. A substantially insoluble and infusible resinous composition obtained by curing a composition comprising (A) an organic resin forming polyepoxide selected from the group consisting of monomeric and polymeric epoxides having a plurality of reactive 1,2-epoxy groups having an epoxide equivalency of at least 1.0, and (B) a catalytic amount of a 1,1,2,3,3-pentaalkylguanidine wherein the alkyl groups contain from 1 to 6 carbon atoms, inclusive.

12. A substantially insoluble and infusible resinous composition obtained by curing a composition comprising (A) an organic resin forming polyepoxide selected from the group consisting of monomeric and polymeric epoxides having a plurality of reactive 1,2-epoxy groups having an epoxide equivalency of at least 1.0, and (B) a catalytic amount of 1,1,2,3,3-pentamethylguanidine.

13. A substantially insoluble and infusible composition obtained by curing a composition comprising (A) an organic resin forming polyepoxide selected from the group consisting of monomeric and polymeric epoxides having a plurality of reactive 1,2-epoxy groups which comprises a thermosetting resinous reaction product of a polyhydric phenol and an epihalohydrin having an epoxy equivalency of at least 1.0, and (B) a catalytic amount of a 1,1,3,3-tetraalkylguanidine wherein the alkyl groups contain from 1 to 6 carbon atoms, inclusive.

14. A substantially insoluble and infusible resinous composition obtained by curing a composition comprising (A) an organic resin forming polyepoxide selected from the group consisting of monomeric and polymeric epoxides having a plurality of reactive 1,2-epoxy groups which comprises a thermosetting resinous reaction product of bisphenol A and epichlorohydrin having an epoxy equivalency of at least 1.0, and (B) a catalytic amount of 1,1,3,3-teramethylguanidine.

15. A substantially insoluble and infusible resinous composition obtained by curing a composition comprising (A) an organic resin forming polyepoxide selected from the group consisting of monomeric and polymeric epoxides having a plurality of reactive 1,2-epoxy groups which comprises a thermosetting resinous reaction product of a polyhydric phenol and an epihalohydrin having an epoxy equivalency of at least 1.0, and (B) a catalytic amount of a 1,1,2,3,3-pentaalkylguanidine wherein the alkyl groups contain from 1 to 6 carbon atoms, inclusive.

16. A substantially insoluble and infusible resinous composition obtained by curing a composition comprising (A) an organic resin forming polyepoxide selected from the group consisting of monomeric and polymeric epoxides having a plurality of reactive 1,2-epoxy groups which comprises a thermosetting resinous reaction product of bisphenol A and epichlorohydrin having an epoxy equivalency of at least 1.0, and (B) a catalytic amount of 1,1,2,3,3-pentamethylguanidine.

References Cited by the Examiner
UNITED STATES PATENTS
3,028,342  4/1962  Katz et al. _____ 260—47
FOREIGN PATENTS
133,819  8/1949  Australia.

SAMUEL H. BLECH, *Primary Examiner.*
WILLIAM H. SHORT, *Examiner.*
T. D. KERWIN, *Assistant Examiner.*